(12) United States Patent
Ullmann et al.

(10) Patent No.: US 10,642,424 B2
(45) Date of Patent: May 5, 2020

(54) CAPACITIVE SENSOR ELEMENT AND METHOD FOR THE PRODUCTION THEREOF

(71) Applicant: POLYIC GmbH & Co. KG, Furth (DE)

(72) Inventors: Andreas Ullmann, Zirndorf (DE); Walter Fix, Furth (DE); Manfred Walter, Nuremberg (DE)

(73) Assignee: POLYIC GMBH & CO. KG, Fürth (DE)

( * ) Notice: Subject to any disclaimer, the term of this patent is extended or adjusted under 35 U.S.C. 154(b) by 232 days.

(21) Appl. No.: 15/109,306

(22) PCT Filed: Jan. 7, 2015

(86) PCT No.: PCT/EP2015/050175
§ 371 (c)(1),
(2) Date: Jun. 30, 2016

(87) PCT Pub. No.: WO2015/104295
PCT Pub. Date: Jul. 16, 2015

(65) Prior Publication Data
US 2016/0328048 A1    Nov. 10, 2016

(30) Foreign Application Priority Data

Jan. 10, 2014 (DE) .................... 10 2014 100 246

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC ........ G06F 3/044; G06F 3/0412; G06F 1/169; G01L 1/146; G01L 9/0073; H05K 1/028; H05K 31/0508
(Continued)

(56) References Cited

U.S. PATENT DOCUMENTS

| 5,381,300 | A | * | 1/1995 | Thomas | ............... | G01L 9/0073 |
| | | | | | | 361/280 |
| 2004/0135588 | A1 | * | 7/2004 | Bissonnette | ........... | G01B 7/023 |
| | | | | | | 324/662 |

(Continued)

FOREIGN PATENT DOCUMENTS

| CN | 101814256 A | 8/2010 |
| CN | 201773378 U | 3/2011 |

(Continued)

OTHER PUBLICATIONS

Chinese Office Action Application No. CN20158004035 dated Apr. 19, 2019.

*Primary Examiner* — Fred Tzeng
(74) *Attorney, Agent, or Firm* — Hoffmann & Baron, LLP

(57) ABSTRACT

The invention relates to a capacitive sensor element with a plurality of sensor fields, as they correspond for example to the arrangement on a touch screen. This capacitive sensor element comprises at least one multilayer body made up of two structured electrically conductive layers and an insulating layer in between. The invention provides a layout with redundant conductive strips for an arrangement of crossing conductive strips, through which the requirement for register accuracy in the two-layer lamination of layer electrodes is reduced, in particular with respect to connecting the connections to the plugs in the edge area of a module using a corresponding sensor element.

25 Claims, 9 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2010/0013499 A1* | 1/2010 | Tong | H03K 17/9622 |
| | | | 324/661 |
| 2010/0214262 A1 | 8/2010 | Ishizaki et al. | |
| 2011/0102370 A1 | 5/2011 | Kono et al. | |
| 2011/0120228 A1* | 5/2011 | Main | G01L 1/146 |
| | | | 73/724 |
| 2011/0193801 A1 | 8/2011 | Jung et al. | |
| 2012/0050167 A1* | 3/2012 | Krahenbuhl | G06F 1/169 |
| | | | 345/169 |
| 2012/0193130 A1 | 8/2012 | Fix et al. | |
| 2013/0112542 A1* | 5/2013 | Wang | G06F 3/0412 |
| | | | 200/600 |
| 2013/0301196 A1 | 11/2013 | Miyazaki et al. | |
| 2015/0022980 A1* | 1/2015 | Van Den Brink | H05K 1/028 |
| | | | 361/749 |
| 2015/0029148 A1 | 1/2015 | Wang et al. | |
| 2016/0035924 A1* | 2/2016 | Oraw | H01L 31/0508 |
| | | | 136/244 |

FOREIGN PATENT DOCUMENTS

| | | |
|---|---|---|
| CN | 102156596 A | 8/2011 |
| CN | 202563484 U | 11/2012 |
| CN | 103207719 | 7/2013 |
| DE | 102009014757 | 10/2010 |
| DE | 102011115851 | 4/2013 |
| EP | 2544080 | 1/2013 |
| GB | 2478804 | 9/2011 |
| WO | WO2005114369 | 12/2005 |
| WO | WO2013063188 | 5/2013 |

\* cited by examiner (State of the Art)

(State of the Art)

CAPACITIVE SENSOR ELEMENT AND METHOD FOR THE PRODUCTION THEREOF

This application claims priority based on an International Application filed under the Patent Cooperation Treaty, PCT/EP2015/050175, filed on Jan. 7, 2015, and German Application No. DE 102014100246.6, filed on Jan. 10, 2014.

BACKGROUND OF THE INVENTION

The invention relates to a capacitive sensor element with a plurality of sensor fields, as they correspond for example to the arrangement on a touch screen. This capacitive sensor element comprises at least one multilayer body made up of two structured electrically conductive layers and an insulating layer in between. The invention also relates to a method for the production of such a sensor element.

Such capacitive sensor elements are known from DE 10 2011 115 851 A1. The sensor elements disclosed therein comprise for example conductive strips arranged according to the "bar and stripe" principle as electrodes. For example, wide conductive strips, "bars" or bar electrodes, which run—again for example—in the x-direction, lie on a first, lower electrically conductive layer, and narrow conductive strips, "stripes" or stripe electrodes, which run in the y-direction lie on a second electrically conductive layer arranged above the first. The two electrically conductive layers are galvanically separated by an insulating layer. At the crossover points of bars and stripes touch sensor fields, so-called touch fields, are formed.

The different geometrical formation of the electrodes as bars and stripes is favourable because of the course of the electric field lines between the conductive strips of the first and second electrically conductive layers. Because of the formation of the second electrically conductive layer as "stripes" there are many field lines which run through the space above the sensor element and which are disrupted by touching with the input element. The disruption of the course of the field lines corresponds to the input and can be determined more reliably by a greater number of disrupted field lines.

According to the previously known layouts for the electrically conductive layers of a capacitive sensor element, such as for example the layout known from DE 10 2011 115 851 A1, it is essential for reading the input signals that the first and second electrically conductive layers lie accurately one on top of the other. On the bar and stripe electrodes, connections are provided which transmit the signals from the sensor fields via corresponding plugs in an edge area of the module comprising the sensor element, with the result that an input can be clearly assigned and reliably read.

By "module" is meant here for example a Smartphone, an iPad or other touch screen. The sensor element forms at least a part of the input area of a touch screen and is preferably formed transparent.

The connections fit into plugs that are provided in the edge area of the sensor element. In order that the plugs also reliably make contact with the connections during assembly and thus all inputs can be read via the connections, it is necessary or at least advantageous for the reliability of the sensor element that the electrically conductive layers are laid accurately one on top of the other during assembly of the sensor element. In particular it is advantageous that the position of the two electrically conductive layers deviate for example by less than 200 µm, better still by less than 100 µm from their theoretically assigned location, at which the contacts to the plugs are provided. The tolerance limit during assembly of the previously known sensor elements can therefore be indicated as 200 µm or less.

This requirement of the production method is difficult to meet economically, which also makes assembly very expensive.

SUMMARY OF THE INVENTION

An object of the present invention is therefore to provide a sensor element with an arrangement of connections and conductive strips on the electrically conductive layers, in which the tolerance limit for the assembly of the two electrically conductive layers, for bringing the connections into contact with the plugs, is set at the value mentioned at the beginning. In particular an object of the present invention is to provide a sensor element which is suitable for mass production and can be produced inexpensively.

A subject of the present invention and solution to the object is therefore a capacitive sensor element, comprising at least one multilayer body made up of two structured electrically conductive layers and an insulating layer in between, wherein the structuring of the electrically conductive first and second layers comprises conductive strips, in each case galvanically separated from each other, only some of which are connected to connections, wherein the connections of the first and second electrically conductive layers lie in one plane and the insulating layer does not separate the two structured electrically conductive layers from each other over the whole surface.

The invention is based on the general knowledge that placing the connections leading to the plugs in the edge area together in a single electrically conductive layer plane allows for greater scope for the positioning of the individual layers.

According to an advantageous embodiment it is provided that conductive strips, in particular the stripe electrodes ($3a, \ldots 3k$) are alternately connected and not connected to a connection (6).

According to a further advantageous embodiment it is provided that a distance between two adjacent conductive strips, comprising or not comprising the width of one conductive strip on an electrically conductive layer plane predetermines a register inaccuracy to be tolerated when laying individual layers forming the multilayer body one on top of the other.

According to a further advantageous embodiment of the sensor element it is provided that the conductive strips of the stripe electrodes are present periodically spaced apart from each other in a regular pattern.

The first and/or second electrically conductive layer preferably has a layer thickness between 20 nm and 1 µm.

The first and/or second electrically conductive layer here is preferably made of a transparent, conductive material, preferably of a transparent film, which is coated in a structured manner, for example printed, with a thin and therefore transparent layer of silver or copper. The first and/or second electrically conductive layer can, however, also be made of a transparent conductive material.

According to an advantageous embodiment the connections lie on the first electrically conductive layer with the wider conductive strips, the so-called "bar" electrodes of a bar and stripe electrode pattern. It is particularly advantageous if all the connections lie on this first, electrically conductive layer.

The embodiment in which the conductive strips which do not lie in a plane with the connections that lead to the plugs can be connected making contact with the connections via conductive pads is particularly preferred. By "conductive pads" is meant here electrically conductive areas of a first electrically conductive layer which are directly connected to electrodes of a second electrically conductive layer via galvanic contact.

In the case where the connections lie on the first electrically conductive layer, a conductive pad is a small electrode segment that lies inside and/or outside the transparent area of the sensor element and is not galvanically separated from the second electrically conductive layer by the insulating layer.

According to an advantageous embodiment the narrower conductive strips, the stripe electrodes, lie on the second electrically conductive layer.

Again, it can be advantageous that the stripe electrodes are applied as continuous strips of conductive material on a preferably transparent, endless band. This application of the strips can for example be carried out by printing, in particular in a roll-to-roll process.

During the production of the conductive strips and/or connections by printing it is advantageous if a band-type support material of flexible plastic is present, which can be printed with conductive material in the roll-to-roll process.

It has proved particularly economically favourable if at least one conductive strip is printed as an endless strip in the direction of travel of a support band in the roll-to-roll process.

According to a further embodiment the wider bar electrode conductive strips are present in the direction of travel of the band.

The insulating layer preferably has a layer thickness in the range from 1 μm to 200 μm, further preferably between 5 μm and 100 μm. The insulating layer is dielectric and preferably has a dielectric constant between 2 and 4, further preferably between 2.5 and 3.5.

A transparent support material is particularly preferred as support material. For example a plastic film, such as for example a PET film, may be used.

The layer thickness of the support film is for example between 18 μm and 450 μm, in particular between 50 and 300 μm and particularly preferably between 100 and 200 μm.

Material that can be processed by printing, particularly preferably in the roll-to-roll process, is preferably used as conductive material. For example conductive pastes that are in particular also metallic, all the conductive polymers and/or the known conductive transparent metal oxides such as ITO and ATO, as well as, particularly preferably, the transparent conductive material "metal mesh" known from DE 10 2009 014 757.8 and/or known from DE 10 2011 115 851 can be used here. The so-called metal mesh material is characterized by the fact that it comprises a transparent plastic film with thin conductor tracks of non-transparent material, and is transparent to the human eye. The tracks of this flexible material are characterized by a width in the range of 5 μm to 25 μm and a coverage of the transparent film in the range between 1% and 20%, preferably in the range of 1% to 15% surface coverage. The material is described in the two above-named patent applications, the content of which is hereby made disclosure of the present invention.

According to a preferred embodiment example of the invention the sensor element is formed as a touch screen sensor element, which is formed in the input area transparent to the human eye.

In this case the dielectric insulating layer consists of a material which is transparent in the wavelength range visible to the human eye.

Furthermore, the first and second electrically conductive layers are formed transparent to the human eye, which can be realized on the one hand through the use of a correspondingly transparent electrically conductive material for the first and/or second electrically conductive layer, and/or through a corresponding choice of the width and thickness of the conductor tracks producing the conductivity of the conductive strips on the transparent support, for example according to the technique known from DE 10 2009 014 757.8 and/or known from DE 10 2011 115 851. Particularly preferably, the width of these tracks is below the resolving power of the human eye, i.e. at a width of less than 50 μm, preferably less than 25 μm. The coverage with tracks per unit area within a conductive strip is between 1% and 20%, in particular between 1% and 15%.

BRIEF DESCRIPTION OF THE DRAWINGS

The invention is explained in more detail below with reference to figures.

DETAILED DESCRIPTION OF THE INVENTION

Figure 1A:
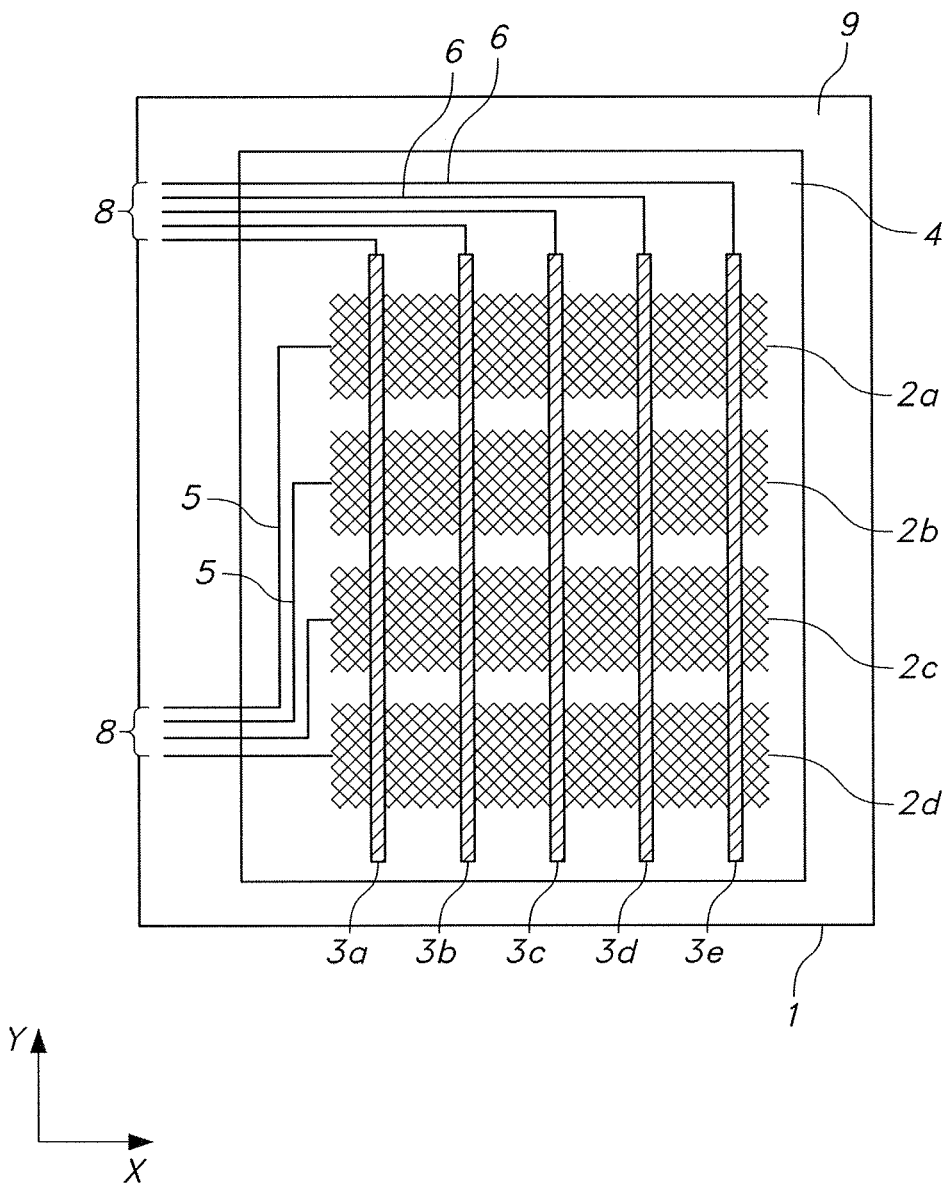
FIGS. 1a and 1b show a layout for the arrangement of conductive strips according to the state of the art

FIG. 1a shows a state of the art "bars" and "stripes" arrangement of conductive strips on two electrically conductive layers 2 and 3 lying one on top of the other, galvanically separated by a transparent dielectric insulating film 4, in different planes on a film support 1. The insulating film 4 here spans the whole transparent input area of the sensor element, which is surrounded by the edge area 9. In the edge area 9 lying outside the transparent input area the connections 5 and 6 of the conductive strips 2a . . . and 3a . . . lead to the connector plugs 8, via which a contact is made with a corresponding module. In order that the connections 5 and 6 engage with the plugs 8 making contact, the positions of the two electrically conductive layers must lie accurately one on top of the other. This is illustrated in FIG. 1b.

Figure 1B:
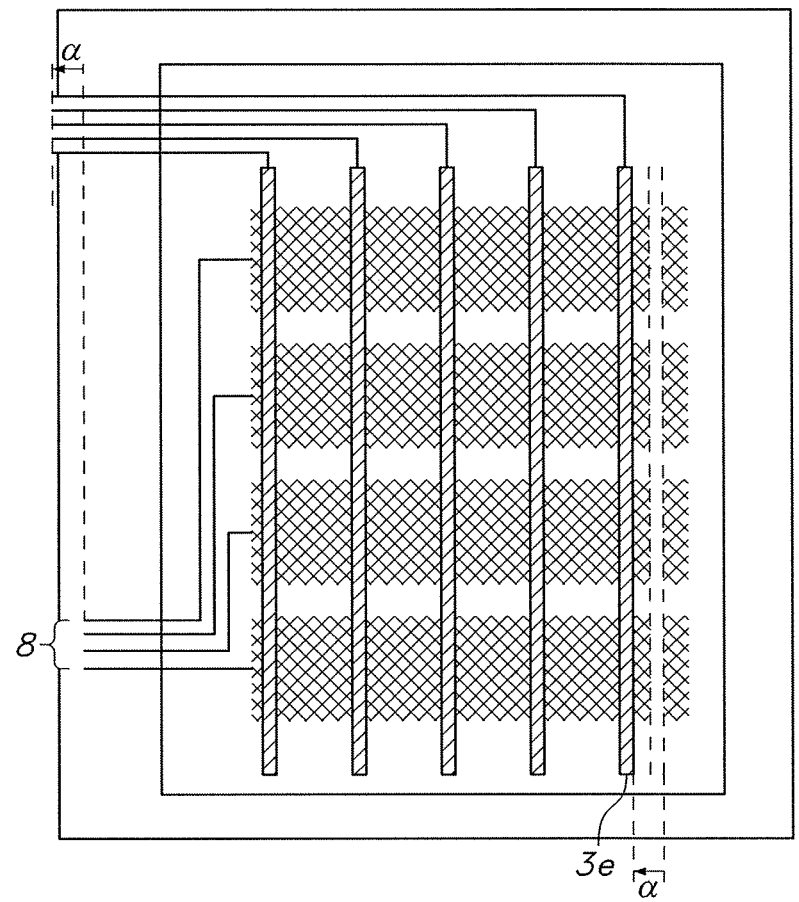

FIG. 1b shows a minimal register inaccuracy "a" when the individual layers of the two electrically conductive layers are laid, for example laminated, one on top of the other. The stripe electrodes 3 shift by the length "a" with respect to the bar electrodes 2. This could be tolerated if the connections 6 of the stripe electrode layer, likewise moved by a distance "a", did not end in the edge area. However, because the connections 6 end in the edge area, likewise displaced by the distance "a", it is here no longer possible for contact to be made via the plugs 8 and thus a register inaccuracy of the dimension "a" cannot be tolerated. "a" refers to lengths of at least 100 μm to 200 μm or more.

FIG. 2 show how this problem is solved according to a preferred embodiment of the invention. For this, FIG. 2a shows only the first electrically conductive layer with the insulating film 4 on top. The same bar electrodes 2a to 2d can be seen as could already be seen in FIG. 1a. These bar electrodes 2a to 2d are brought into contact with a plug 8 via the connections 5. The bar electrodes are covered by the insulating film 4. Outside the covering by the insulating film 4, on the first electrically conductive layer conductive pads 7a to 7e which are connected to a further plug 8 via connections 6, can also be seen. Unlike in FIG. 1 which shows the state of the art, here the connections 6 are on the same layer plane as the connections 5.

In this embodiment the connections 6 are at least partially covered by the insulating film 4, in order to avoid short circuits.

Figure 2A:
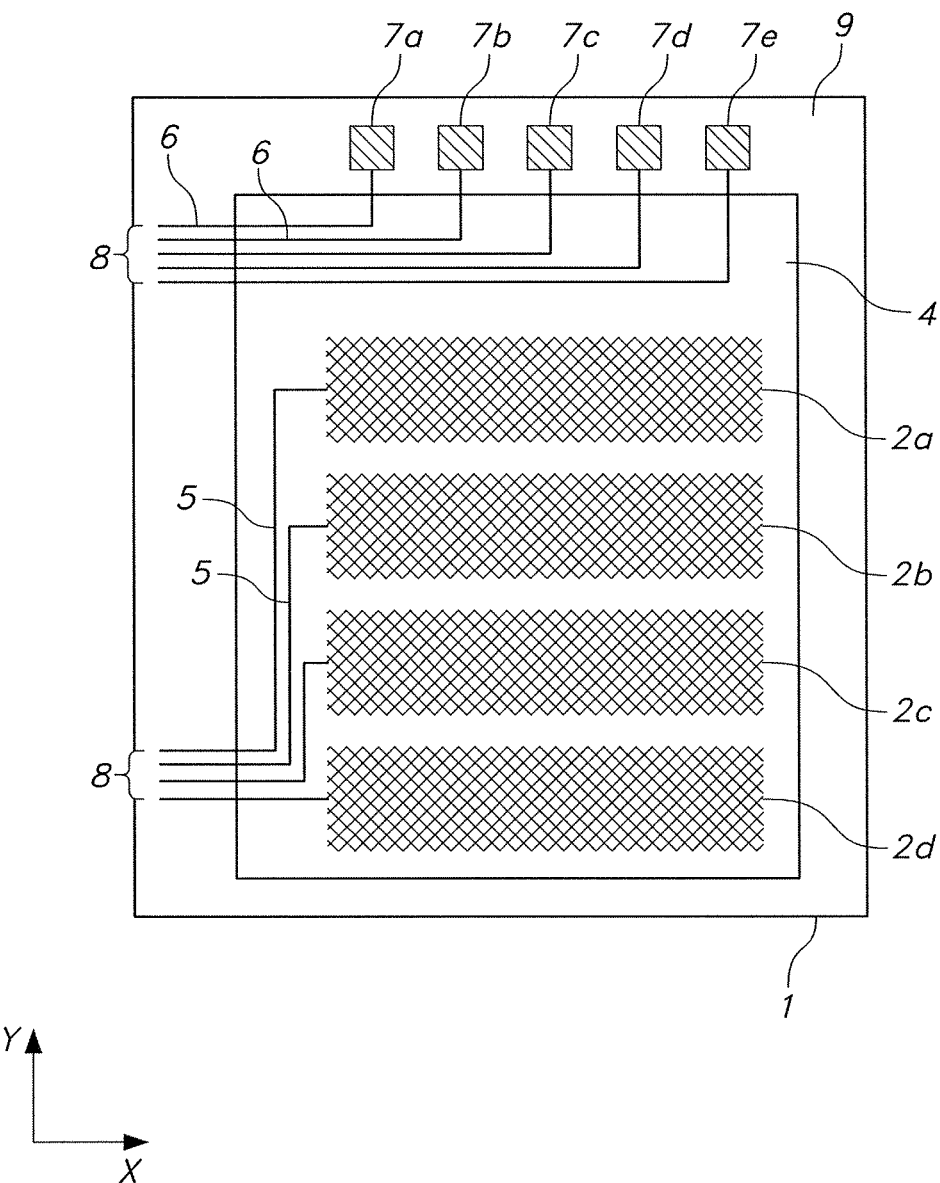
FIGS. 2a, 2b and 2c show views comparable with FIG. 1 according to an embodiment example of the present invention
Figure 2B:
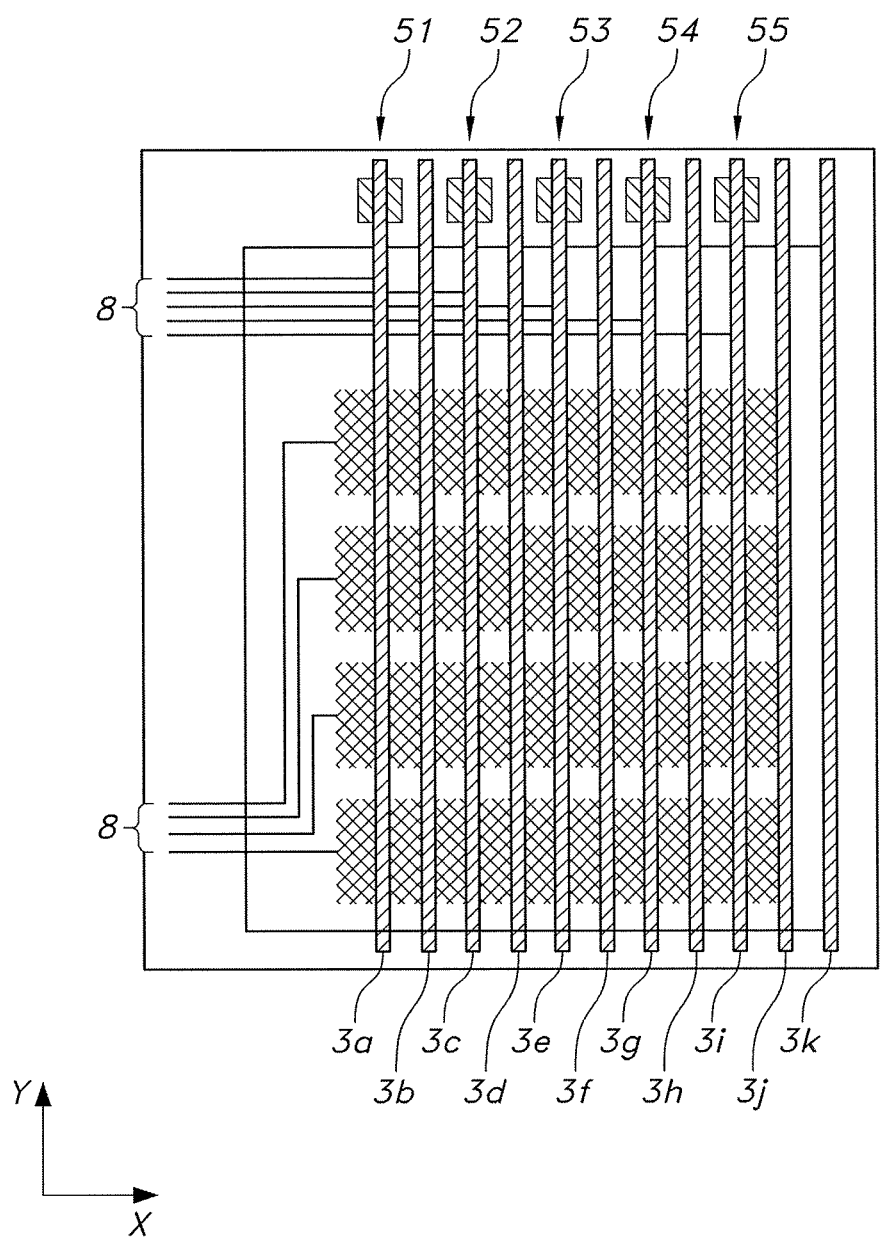

FIG. 2b shows the overall picture corresponding to FIG. 1a with the second, electrically conductive, layer above the insulating film 4. The second electrically conductive layer comprises a plurality of stripe electrodes 3a to 3k, not each of which is coupled to a connection 6. From a practical point of view, every second stripe electrode is redundant, i.e. not connected and therefore superfluous. However, this redundancy principle allows a great register tolerance because, with the stripe electrode layer according to this embodiment with redundancy, any stripe electrode already comes accurately into position and is thus also connected.

The stripe electrodes 3a to 3k lie at least partially on the conductive pads of the first electrically conductive layer, because these are not covered by the insulating film 4. With the position of the second electrically conductive layer shown in FIG. 2b, the stripe electrodes 3a, 3c, 3e, 3g and 3i are in electrical contact. Thus the stripe electrodes 3, which come to lie on one of the conductive pads 7a to 7e of the first electrically conductive layer during the production of the sensor element, have a directly electrically conductive connection with the connections 6, which lead to a plug 8.

Figure 2C:
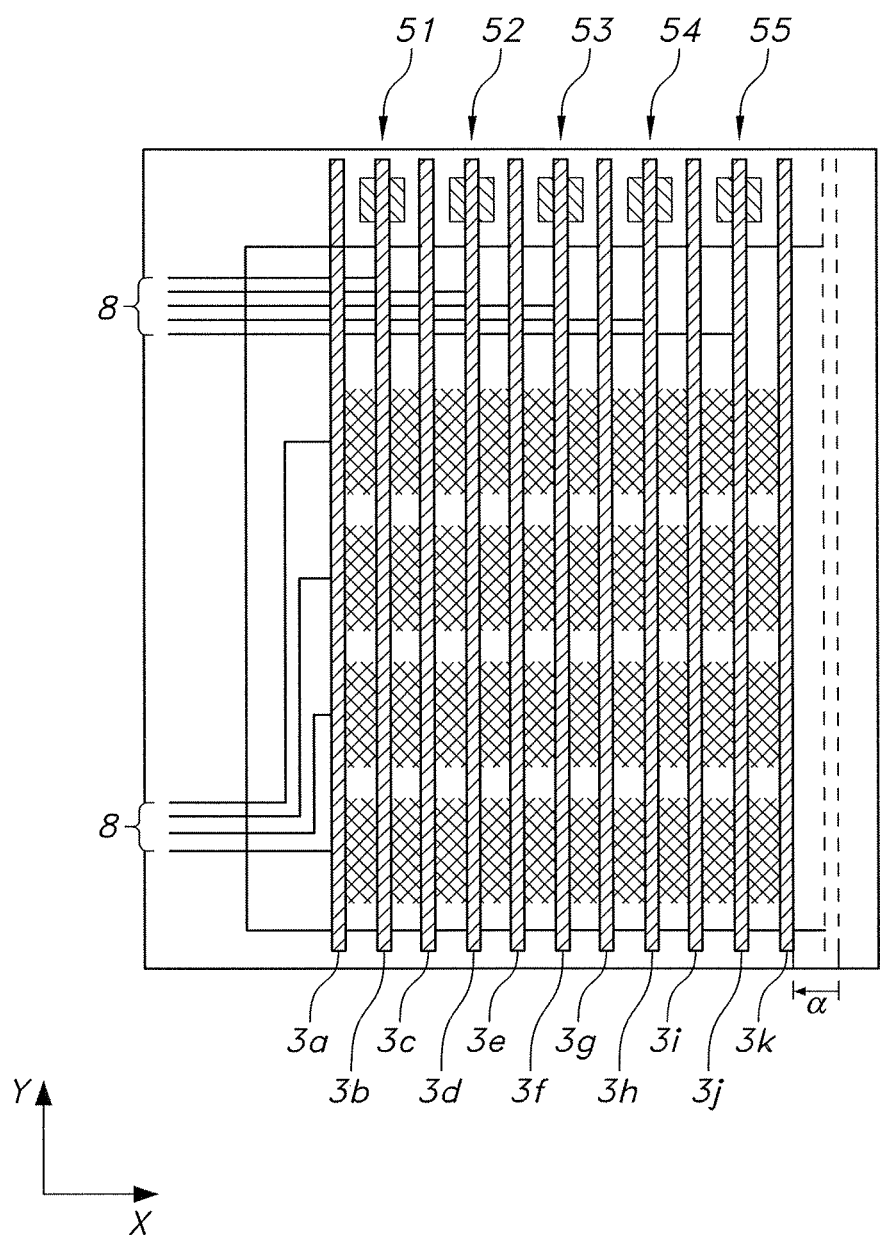

FIG. 2c shows a view comparable to FIG. 1b. Because of the difficulties with the precise layering of the individual electrically conductive layers one on top of the other, a shift of the second electrically conductive layer by the length "a" with respect to the first electrically conductive layer can also result here. As can be seen directly at first sight, however, this no longer has any effect at all on the contact made by the plugs 8, as the connections 5 and 6 to the plugs 8 all lie on one layer plane and thus accurately fitting the plugs 8.

According to FIG. 2c only the stripe electrodes 3b, 3d, 3f, 3h and 3j are still connected via the conductive pads 7a to 7e and the connections 6 to the plugs 8 and thus to the controlled module.

The stripe electrodes 3a, 3c, 3g, 3i and 3k which are contacted according to FIG. 2b lie outside the conductive pads 7a to 7e on the first electrode layer and thus no longer lead to any connection 6. These stripe electrodes are accordingly redundant and do not contribute to the operation of the sensor element. However, they are decisive for the suitability of the sensor element for mass production, as the electrodes which are redundantly present create a free space with respect to the necessary register tolerance during production. Furthermore, the redundant conductive strips are also not disruptive, rather they may contribute visually to a more homogeneous appearance, as well as to more unified transmission.

An embodiment in which the redundant conductive strips are applied always equally spaced, i.e. with periodicity, is particularly preferred.

The conductive strips of the electrically conductive layers, i.e. in particular bar electrodes 2a to 2d and stripe electrodes 3a to 3k can be formed in different sizes and extend over different areas of the sensor element. For example these bar and stripe electrodes run at least over the transparent area of a sensor element, but can also be extended any desired distance over the edge area of the sensor element, which is not transparent under certain circumstances, or over several sensor elements, up to the longest formation, the continuous design, in which they are formed as endless strips, right through to the complete band material of a roll-to-roll printing process. In order to produce the sensor element two or more printed bands are correspondingly cut, laid one on top of the other to form a multilayer body and joined and/or laminated together.

According to a preferred embodiment of the invention the stripe electrodes 3 run along the print direction. This is particularly advantageous in the roll-to-roll printing process, when stripe electrodes are cost-effectively printed on the whole length of the support band in a continuous printing process. This can be achieved both for the embodiment of the invention in which redundant stripe electrodes are provided, and in the embodiment of the invention without redundant stripe electrodes. In any case the stripe electrodes extend in the print direction over the whole length of the print band.

Figure 2D:
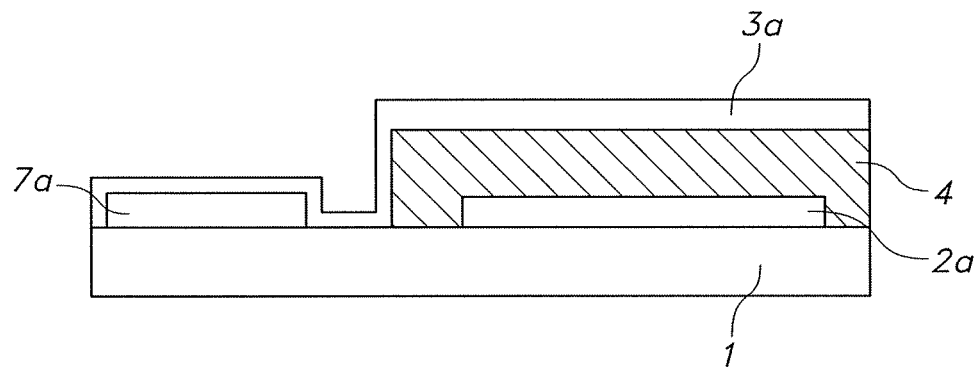
FIG. 2d shows a cross section thereof

FIG. 2d shows a cross section through a part of a sensor element according to an embodiment of the invention shown in FIG. 2. It shows a cross section through the conductive pad 7a from FIG. 2b on the support 1, along the stripe electrode 3a beyond the bar electrode 2a. In particular it also shows the position of the insulating film 4, which galvanically separates the stripe electrode 3a from the bar electrode 2a, but not the conductive pad 7a, which lies in the same plane as the bar electrode 2a, from the stripe electrode 3a, which connects directly thereto.

Figure 3A:
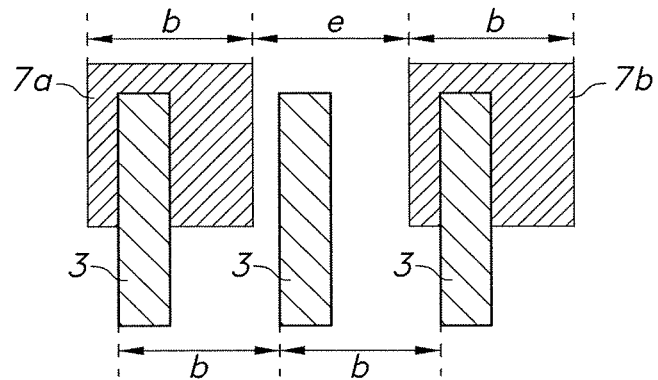
FIGS. 3a and 3b show details of the conductive pads from FIG. 2
Figure 3B:
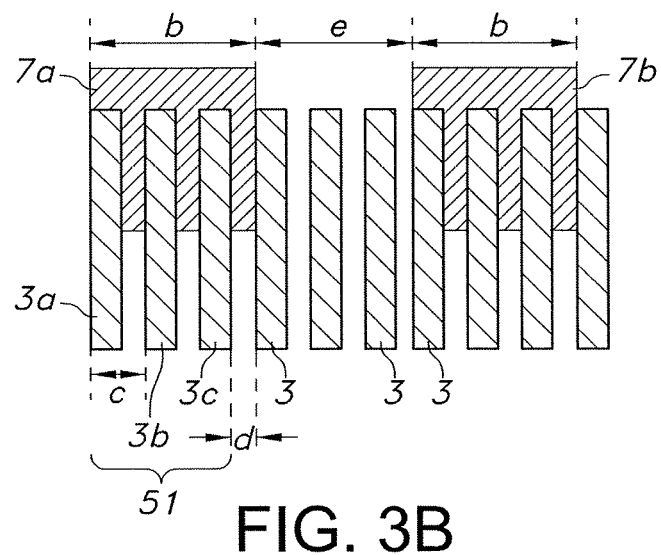

FIGS. 3a and 3b show different degrees of redundancy. In FIG. 3a the distance "b" between the stripe electrodes 3 is equal to the distance between the conductive pads 7a and 7b. The width of the conductive pads 7a and 7b also corresponds to this length "b". In this way it is ensured that a single stripe electrode 3 is always also connected to one of the conductive pads 7. The length "b" from FIGS. 2b and 3a therefore represents the periodicity of the redundant stripe electrodes and the width of a gap S1 to S5. The length "e" represents the distance between two conductive pads.

FIG. 3b diagrammatically shows another preferred configuration. The distance "c" between the stripe electrodes 3 is significantly smaller than the width of the gaps S1 to S5 and smaller than the width of and distance between the conductive pads. In this way, for example, the gap S1 (FIG. 2b) is formed by the stripe electrodes 3a to 3c together. In the case of an assumed width "b" of a conductive pad, 1 to 10 stripe electrodes, preferably 1 to 7 stripe electrodes can be accommodated. The width "b" corresponds for example to the width of a stripe electrode according to the state of the art (FIG. 1a). "b" can for example lie in the range from 0.5 to 3 mm, for example at 2 mm.

The length "c", which comprises the distance between two adjacent stripe electrodes plus the width of one stripe electrode, lies for example in the range between 0.1 to 5 mm, preferably between 0.2 to 3 mm, particularly preferably between 0.4 mm and 1 mm. The length "c" corresponds to the periodicity of the redundantly arranged electrodes.

The length "d", which describes only the distance between two adjacent stripe electrodes, lies for example in the range between 5 μm and 20 μm, precisely in order to guarantee a galvanic separation between two adjacent conductive strips.

The distance "e" between two adjacent conductive pads is dependent on the size of the sensor fields; it can for example lie in the range from 1 to 10 mm, advantageously in the range from 2 to 8 mm and in particular at approximately 4 to 5 mm.

Figure 4A:
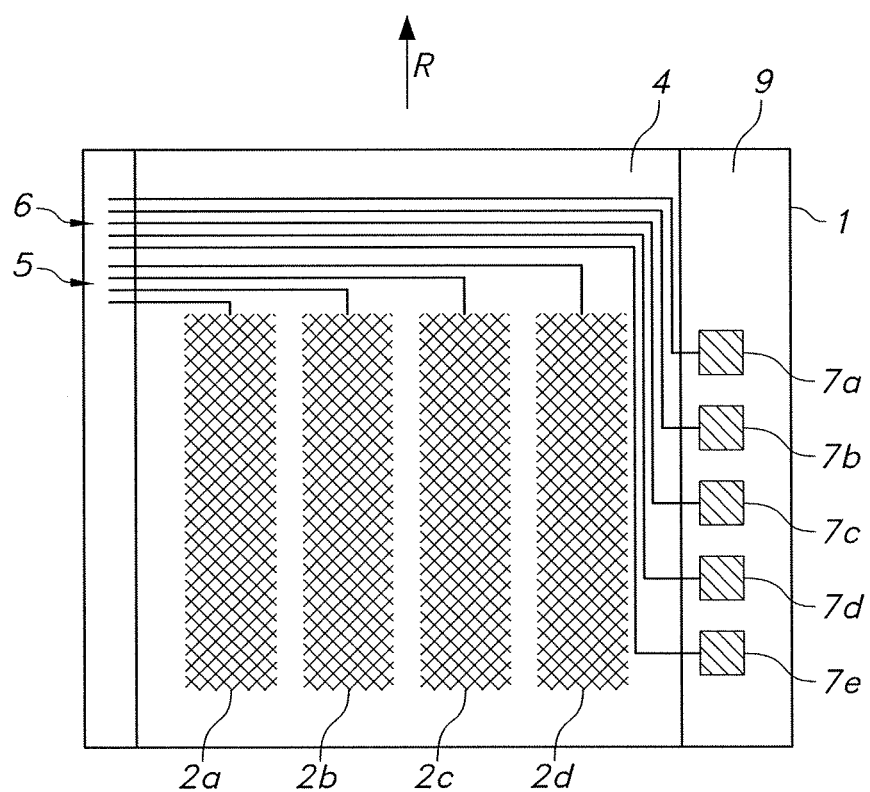
FIGS. 4a and 4b show a layout for the arrangement of conductive strips according to a further embodiment example of the invention, which is comparable but rotated by 90°
Figure 4B:
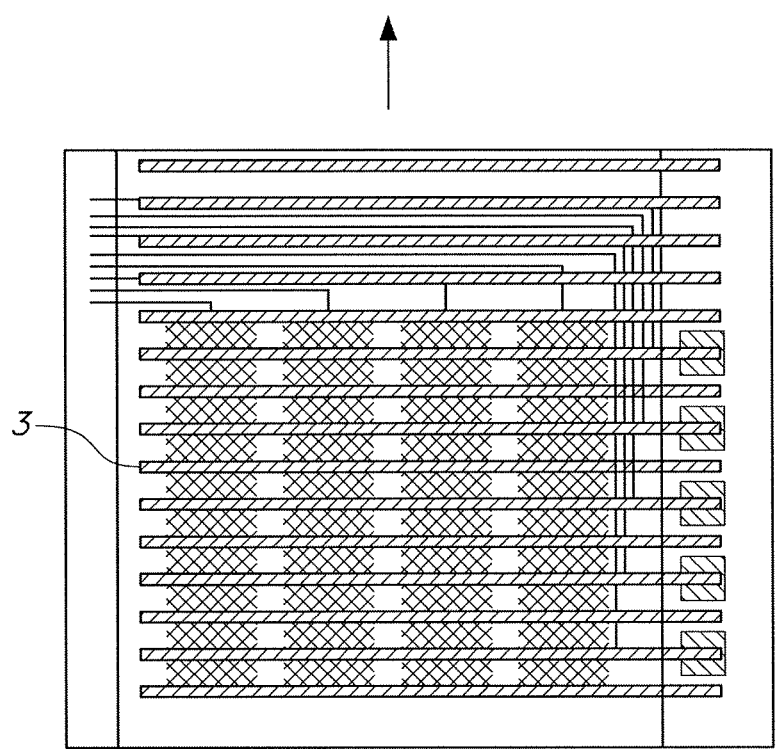

FIGS. 4a and 4b show a further embodiment example, which is highly relevant in terms of the process in the case of a continuous roll-to-roll printing process. In the embodiment example according to FIG. 2 the insulating film 4 covers the bar electrodes 2a to 2d and the connections 6, but not the conductive pads 7a to 7e, which lie outside the input area 4 in the—not necessarily transparent—edge area 9.

In the embodiment example according to FIG. 2 the insulating layer 4 is correspondingly applied in a structured manner. In contrast to this is the embodiment example shown in FIG. 4, where the insulating film 4 can be applied in the continuous process without structuring, because the conductive pads 7a to 7e lie outside the band width of the insulating film 4 in the direction of travel "R" of the printable support band. According to this embodiment example, the bar electrodes 2a to 2d are applied, for example printed, in the direction of travel of the support band.

FIG. 4b shows the complete sensor element with the stripe electrodes 3 overlaying the bar electrodes, which stripe electrodes are galvanically separated in the area of the connections 5 and 6 by the continuous insulating film 4, as shown by FIG. 4a. The stripe electrodes 3 are redundant in the embodiment shown here both in the area of the bar electrodes 2a to 2d and in the area of the connections 5 and 6, applied as stripe electrodes 3'. This can be technically more cost-effective in terms of the process than a structured application and, as already mentioned above, does not disrupt the functionality, but under certain circumstances even improves the visual appearance.

The contacting of the conductive pads 7 with simultaneous insulation of the connections 6 can on the one hand take place through a structuring of the insulating film 4, but on the other hand also by replacing the insulating material 4 at the positions of the conductive pads 7 with a conductive through-contact and/or a conductive adhesive material.

In particular it is also possible to join, for example to laminate together, the first electrically conductive layer with the bar electrodes 2a to 2d and the second electrically conductive layer with the stripe electrodes 3a to 3k via an insulating layer 4 designed as an adhesive layer, wherein in the area of the conductive pads a so-called "anisotropic conductive film" adhesive is applied at the same time. This conductivity adhesive can, together with the insulating adhesive for forming the insulating film 4, again be printed over the whole width of the print band in the process.

In the area between the conductive pads 7 and the stripe electrodes 3, or the bar electrodes 2 respectively—depending on the embodiment—either no material or no electrically conductive material is provided.

Figure 5A:
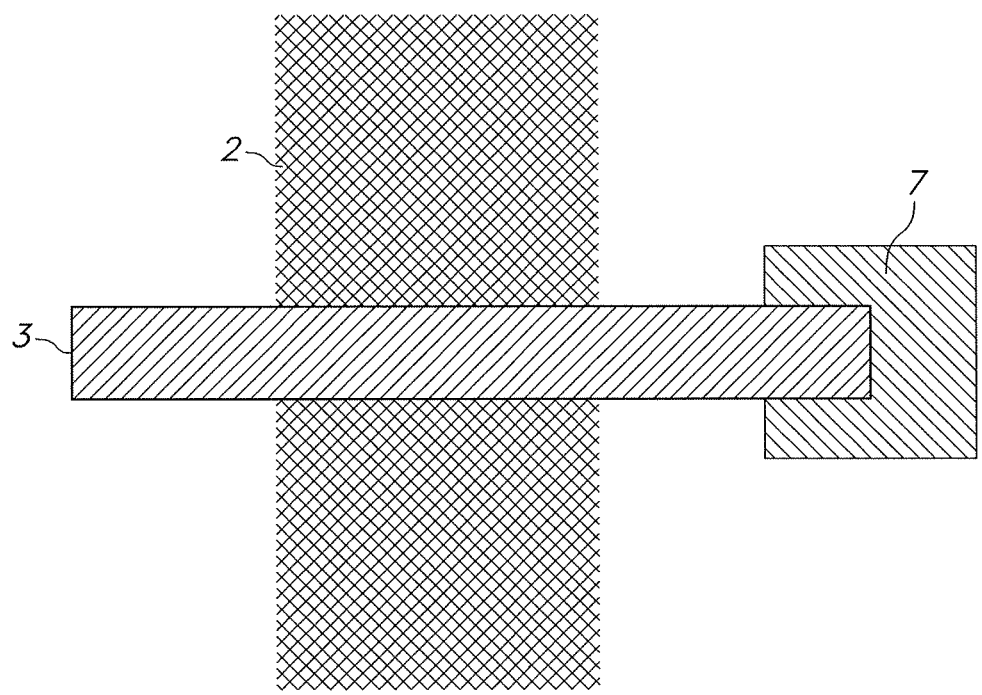
FIG. 5a shows a detail of a conductive pad from FIG. 4
Figure 5B:
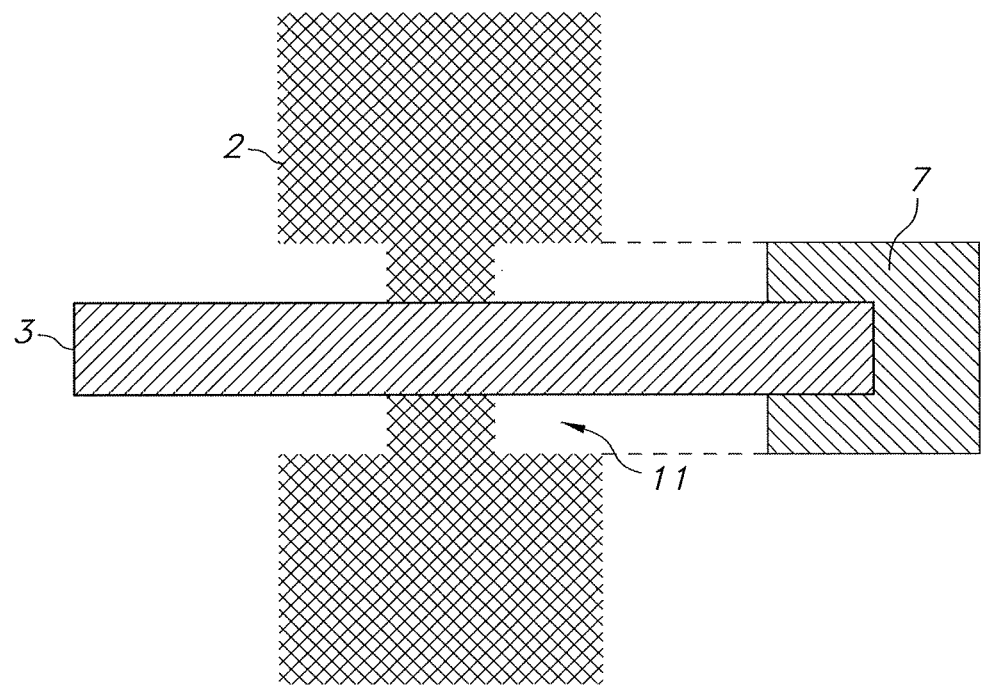
FIG. 5b shows an alternative embodiment of the detail of a conductive pad from FIG. 4

FIGS. 5a and 5b show the area A from FIG. 4b in detail. FIG. 5a (top view as in FIG. 4b) shows how the stripe electrode 3 crosses the bar electrode 2 lying beneath it, but separated by insulating film 4 (not shown here) and then makes contact with the conductive pad 7. A connection 6 (not shown here) goes from the conductive pad 7 to the plug 8 (likewise not shown for the sake of clarity).

The bar electrode 2 is realized in FIG. 5a as a complete rectangle. In FIG. 5b a further embodiment is shown, in which the bar electrode 2 is narrowed in the crossover area with the stripe electrode 3. This gives rise to a field line course which is improved as it covers more space, and consequently to increased reliability when reading an input. This narrowing forms at least one gap 11, which for optimization of the field line course accurately occupies the width of a conductivity pad 7 which lies in the same layer plane.

The embodiment shown in FIG. 5b is particularly preferred in the case of the invention as it can only be reasonably used with the layout presented here for the first time, where an increased tolerance of the register accuracy, in particular with application of electrodes in a redundant manner, is guaranteed.

The invention provides a layout with redundant conductive strips for an arrangement of crossing conductive strips, through which the requirement for register accuracy in the two-layer lamination of layer electrodes is reduced, in particular with respect to connecting the connections to the plugs in the edge area of a module using a corresponding sensor element.

The invention claimed is:

1. A capacitive sensor element comprising at least one multilayer body, the multilayer body comprising:
    a first structured electrically conductive layer having first conductive strips galvanically separated from each other, first conductive strip connections electrically connected to respective first conductive strips, conductive pads and conductive pad connections electrically connected to respective conductive pads, the first conductive strips, the first conductive strip connections, the conductive pads and the conductive pad connections being disposed in a common first plane;
    a second structured electrically conductive layer comprising a plurality of stripe electrodes galvanically separated from each other, said plurality of stripe electrodes including at least one stripe electrode electrically coupled to a respective conductive pad of the first electrically conductive layer and at least one stripe electrode not electrically coupled to a conductive pad of the first electrically conductive layer, whereby not every stripe electrode is electrically coupled to a conductive pad of the first electrically conductive layer; and
    an insulating layer disposed between the first and second electrically conductive layers, the insulating layer covering the first conductive strips and at least a portion of the first conductive strip connections, but leaving the conductive pads of the first structured electrically conductive layer exposed to the second structured electrically conductive layer,
    whereby the at least one of said plurality of stripe electrodes electrically coupled to a respective conductive pad of the first electrically conductive layer of the second structured electrically conductive layer remains in electrical contact with the respective conductive pad of the first structured electrically conductive layer despite a shift in alignment of the first structured electrically conductive layer with respect to the second structured electrically conductive layer to eliminate possible errors in register accuracy between the first structured electrically conductive layer and the second structured electrically conductive layer.

2. A sensor element according to claim 1, wherein conductive strips of the stripe electrodes are alternately connected and not connected to a connection.

3. A sensor element according to claim 2, wherein a distance between two adjacent conductive strips of the stripe electrodes predetermines the periodicity at which conductive strips connected and not connected to connections lie next to each other on an electrically conductive layer.

4. A sensor element according to claim 1, wherein the conductive strips of the stripe electrodes are present periodically spaced apart from each other in a regular pattern.

5. A sensor element according to claim 1, wherein the first and/or second electrically conductive layer has a layer thickness between 20 nm and 1 µm.

6. A sensor element according to claim 1, wherein the connections lie in the first, electrically conductive, layer plane with the wider conductive strips, the bar electrodes.

7. A sensor element according to claim 1, wherein the conductive strips which do not lie in a plane with the connections that lead to plugs are connected making contact with the connections via conductive pads.

8. A sensor element according to claim 1, further comprising an area which is formed transparent.

9. A sensor element according to claim 1, wherein at least one conductive pad is provided, which lies inside the transparent area of the sensor element.

10. A sensor element according to claim 1, wherein a conductive pad is provided, which lies outside the transparent area of the sensor element.

11. A sensor element according to claim 1, further comprising at least one layer which can be produced by printing of a support band.

12. A sensor element according to claim 1, further comprising at least one layer which can be produced by printing in the continuous process.

13. A sensor element according to claim 1, further comprising at least one layer, which can be produced in a roll-to-roll process.

14. A sensor element according to claim 13, which can be produced by laminating a second electrically conductive layer onto a first electrically conductive layer by means of an insulating adhesive layer applied in a structured manner.

15. A sensor element according to claim 1, which can be produced by lamination of several layers.

16. A sensor element according to claim 15, which can be produced by laminating a second electrically conductive layer onto a first electrically conductive layer by means of an electrically insulating adhesive layer applied in a structured manner over the electrodes on the first conductive layer and the connections and by means of an electrically conductive adhesive applied over the conductive pads in a structured manner.

17. A sensor element according to claim 1, which can be produced by laminating a second electrically conductive layer onto a first electrically conductive layer by means of an insulating adhesive layer.

18. A sensor element according to claim 1, in which the first conductive strips in the area of the crossover points with the second conductive strips have gaps, which are not conductive areas.

19. A sensor element according to claim 1, wherein the gaps are adapted to the dimensions at the conductive pads.

20. A method for the production of a layer of a sensor element according to claim 1 by printing in the continuous process.

21. A method according to claim 20, wherein the printing takes place in the roll-to-roll process.

22. A method for the production of a sensor element according to claim 1 by laminating at least two electrically conductive layers one on top of the other with an insulating layer in between.

23. A method according to claim 22, wherein the insulating layer is an adhesive layer.

24. A method according to claim 22, wherein areas of the electrically conductive layers which are not covered with an insulating adhesive layer are connected by application of electrically conductive adhesive.

25. A sensor element according to claim 1, wherein the insulating layer further covers at least a portion of the conductive pad connections of the first structured electrically conductive layer.

* * * * *